United States Patent
Hwang et al.

(10) Patent No.: US 10,063,558 B2
(45) Date of Patent: Aug. 28, 2018

(54) METHOD FOR BLOCKING UNAUTHORIZED DATA ACCESS AND COMPUTING DEVICE WITH FEATURE OF BLOCKING UNAUTHORIZED DATA ACCESS

(71) Applicant: SAMSUNG SDS CO., LTD., Seoul (KR)

(72) Inventors: Sung-Jin Hwang, Seoul (KR); Young-Jun Jung, Seoul (KR); Nam-Min Baik, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 210 days.

(21) Appl. No.: 14/995,821

(22) Filed: Jan. 14, 2016

(65) Prior Publication Data

US 2016/0352748 A1    Dec. 1, 2016

(30) Foreign Application Priority Data

May 28, 2015    (KR) ........................ 10-2015-0074751

(51) Int. Cl.
*H04L 29/06*    (2006.01)

(52) U.S. Cl.
CPC .......... *H04L 63/102* (2013.01); *H04L 63/145* (2013.01); *H04L 63/1408* (2013.01)

(58) Field of Classification Search
CPC .................................................... H04L 63/102
USPC ............................................................ 726/4
See application file for complete search history.

(56) References Cited

U.S. PATENT DOCUMENTS

| | | | |
|---|---|---|---|
| 2008/0209348 A1 | 8/2008 | Grechanik et al. | |
| 2010/0071063 A1 | 3/2010 | Wang et al. | |
| 2011/0320816 A1 | 12/2011 | Yao et al. | |
| 2012/0110666 A1* | 5/2012 | Ogilvie | H04L 63/1408 726/23 |
| 2013/0013914 A1* | 1/2013 | Zhou | H04L 43/04 713/153 |

FOREIGN PATENT DOCUMENTS

| | | |
|---|---|---|
| KR | 10-0676912 B1 | 2/2007 |
| WO | 2011105659 A1 | 9/2011 |

OTHER PUBLICATIONS

Communication dated Mar. 2, 2016, issued by the International Searching Authority in counterpart International Application No. PCT/KR2015/007913 (PCT/ISA/210).

* cited by examiner

*Primary Examiner* — Longbit Chai
(74) *Attorney, Agent, or Firm* — Sughrue Mion, PLLC (57) ABSTRACT

Methods and apparatuses for blocking unauthorized data access are provided, one of methods comprises, monitoring whether there is an access to an object by an accessing instance, receiving an user operation event from a user accessibility management module, wherein the user operation event is created by the user accessibility management module and includes information on a user operation object and blocking at least one of the access to the object and a transmission of the object to an external device via a network, in accordance with the access to the object is monitored, when the accessed object is different from the user operation object or no user operation event is provided for the accessed object.

10 Claims, 8 Drawing Sheets

METHOD FOR BLOCKING UNAUTHORIZED DATA ACCESS AND COMPUTING DEVICE WITH FEATURE OF BLOCKING UNAUTHORIZED DATA ACCESS

This application claims priority from Korean Patent Application No. 10-2015-0074751 filed on May 28, 2015 in the Korean Intellectual Property Office, the disclosure of which is incorporated herein by reference in its entirety.

BACKGROUND

1. Field of the Invention

The present disclosure relates to a method for blocking unauthorized data access and a computing device with a feature of blocking unauthorized data access. Specifically, the present disclosure relates to a method for blocking data access if it is determined that the data access does not involve a user operation, and a computing device with such a feature.

2. Description of the Related Art

Malicious codes are spreading such as spyware that gathers information stored in a computing device without the user's knowledge. Many attempts have been made to block such unauthorized data gathering by malicious codes. For example, if a process of attempting to input/output data is different from a process of inputting a user operation, it is determined that the data access is made independently of the user's intention, and accordingly the access to data and transmission to a network may be blocked. Unfortunately, the above scheme has a problem that a valid data access by a user input may also be blocked if a process of providing a graphic user interface (GUI) for user input is different from a process of performing internal logic operations.

As described above, there has not yet been provided a method for blocking data access by malicious codes that can correctly determine whether a data access involves a user's operation or not. Accordingly, what is required is a technique that can highly correctly determine whether a data access involves a user's operation so as to permit the data access if it does and block the data access otherwise.

RELATED ART DOCUMENT

Patent Document

Korean Patent No. 10-0676912

SUMMARY

An object of the present disclosure is to provide a method for blocking unauthorized data access, in which if there is an access to an object, it is determined whether the access is made by a user operation using a user operation event provided from a user accessibility management module, so that data access which is not made by the user operation and data leakage via a network are blocked, and a computing device using the method.

Another object of the present disclosure is to provide a method for blocking unauthorized data access, in which a valid data access is not blocked even if a process of providing a GUI for a user input is different from a process of performing an internal logic operation, and a computing device using the method.

It should be noted that objects of the present invention are not limited to the above-described objects, and other objects of the present invention will be apparent to those skilled in the art from the following descriptions.

In some embodiments, a method for blocking unauthorized data access, the method comprises monitoring whether there is an access to an object by an accessing instance, receiving an user operation event from a user accessibility management module, wherein the user operation event is created by the user accessibility management module and includes information on a user operation object and blocking at least one of the access to the object and a transmission of the object to an external device via a network, in accordance with the access to the object is monitored, when the accessed object is different from the user operation object or no user operation event is provided for the accessed object.

In some embodiments, a computer program stored in a storage medium to cause a computing device to perform a method comprises monitoring whether there is an access to an object by an accessing instance, receiving an user operation event from a user accessibility management module, wherein the user operation event is created by the user accessibility management module and includes information on an user operation object and blocking at least one of the access to the object and a transmission of the object to an external device via a network, when the accessed object is different from the user operation object.

In some embodiments, a computing device having a feature of blocking unauthorized data access, the computing device comprises a network interface, at least one processor, a memory configured to load a computer program executed by the processor, and storage configured to store data on at least one object, wherein the computer program comprises an operation to monitor whether there is an access to an object in the storage by an accessing instance, an operation to receive an user operation event from a user accessibility management module, wherein the user operation event is created by the user accessibility management module and includes information on an user operation object; and an operation to block at least one of the access to the object and a transmission of the object to an external device via a network, when the accessed object is different from the user operation object.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, a method for blocking unauthorized data access according to an exemplary embodiment of the present disclosure will be described with reference to FIGS. 1 to 6. The method for blocking unauthorized data access according to the exemplary embodiment will be performed only if the feature of blocking unauthorized data access is activated. It is desired that once a computing device to which the method for blocking unauthorized data access according to the exemplary embodiment is applied is connected to a secure network, it is not possible to deactivate the feature of blocking unauthorized data access in the computing device. It may be understood that the method for blocking unauthorized data access according to the exemplary embodiment is performed in the computing device to which the method for blocking unauthorized data access is applied.

Figure 1:
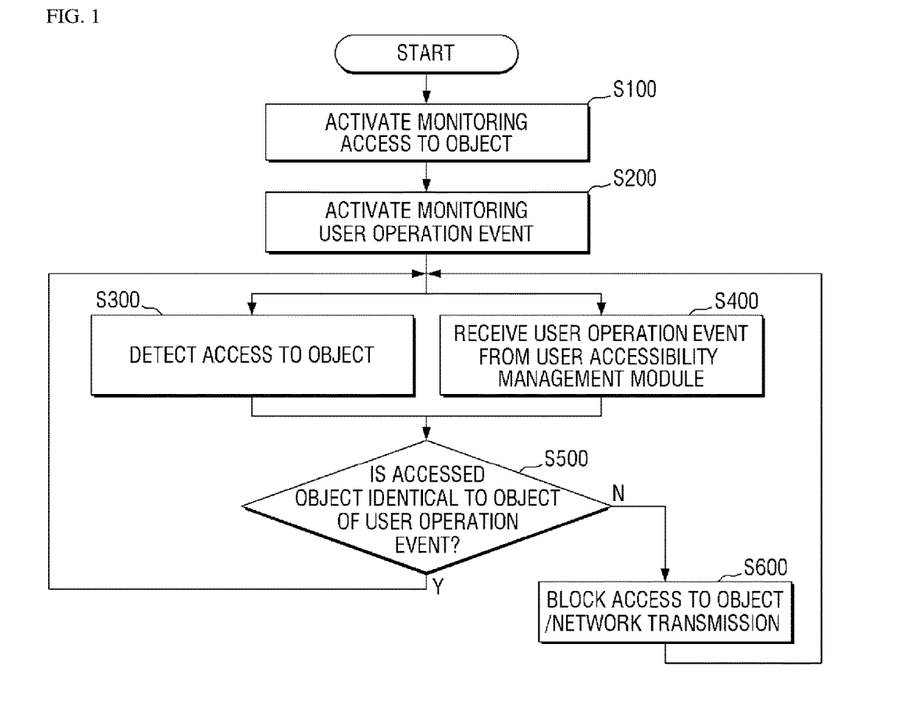
FIG. 1 is a flowchart for illustrating a method for blocking unauthorized data access according to an exemplary embodiment of the present disclosure.

Initially, the execution of a monitoring software component is activated that monitors whether access to data in storage or access via a network is made (operation S100). The storage access refers to reading data stored in the storage, writing to the data, etc. The access via the network refers to an attempt to transmit data to an external device via the network. The monitoring software component may be an agent software component that runs in the background. The agent software component runs automatically when the operating system is booted (auto startup), and it preferably runs again even if it is forced to be terminated. In the following description, the data to be accessed is data of an object, for convenience of illustration.

The object may be, for example, a directory (or a folder) or a file stored in a storage device, data having a data structure stored in a memory, or data of content. The object refers to a unit of data. In addition to the above-listed, a variety of data units may be represented as an object.

The monitoring software component gathers and analyzes data associated with the occurrence of an access to an object and data for identifying the object. The data associated with the occurrence of the access to the object may include access occurrence time information, an identifier of an accessing instance, etc. The instance may be, for example, a process, a thread, etc. Accordingly, the identifier of the accessing instance may be a process ID or a thread ID.

The monitoring software component monitors whether data is accessed using a variety of methods such as user-level API hooking, kernel-level API hooking, device driver hooking, etc. For example, techniques including hooking for a variety of APIs such as file read, file open and network transmission, device driver hooking in storage, and device driver hooking in a network interface may be applied to the monitoring. Hereinafter, a monitoring method using the user-level API hooking will be described in detail for easy understanding.

A callback function for the user-level API hooking is set. For example, the callback function may be set when the monitoring software component is initialized.

The targets of the API hooking are, for example, a file read function and a network transmission function.

The callback function may be set so that it is executed before a target API runs (pre-execution callback) or after a target API runs (post-execution callback) for the API hooking.

Whether to set the pre-execution callback or the post-execution callback is determined by the security policy. For example, if it is desired to block even reading a file, the pre-execution callback for a file read API has to be set. If it is desired to block network transmission, the post-execution callback for a network transmission API has to be set.

Once the callback function for API hooking is successfully set, the callback function set for the file read API will be invoked when file read is attempted by a user application so that the file read API to be hooked may be invoked. In addition, when the user application attempts to network transmission so that file read API to be hooked is invoked, a callback function set for the network transmission API may be invoked.

Subsequently, the monitoring software component activates user operation event monitoring that monitors a user operation event received from a user accessibility management module (operation S200). Hereinafter, the "user accessibility management module" will be described.

The term "accessibility" of the user accessibility management module means a feature that allows everyone including a user having a disability to easily utilize IT devices or services. For example, the accessibility technology includes a feature to provide a magnifying glass on a screen for a user who has poor eye sight, a feature to provide sub-titles for a user who has hearing disability, a feature to provide voice production of the name of a focused object for a user who has sight disability using the text-to-speech (TTS) technique, etc. In short, the user accessibility management module supports a user interface provided by an application so as to ensure the accessibility for users who have disabilities. In other words, the user accessibility management module may modify the user interface so that the user interface provides the accessibility for users who have disabilities. For example, the user accessibility management module may be the Microsoft active accessibility (MSAA) module.

The user accessibility management module provides a variety of information items on the user operation, if it occurs, in the form of a series of events so that a variety of features that allow for accessibility for users having disabilities can be developed by an application. In the following description, such an event provided by the user accessibility management module is referred to as a user operation event.

The monitoring software component monitors the user operation event provided by the user accessibility management module for the following reasons.

The user accessibility management module provides, as the user operation event, an event only when a user inputs an user input to a computing device via an input device (e.g., a keyboard, a mouse, a touch pad, etc.) and a change is made in a GUI due to the user input. That is, the user operation event may not include any event that is irrelevant to a user operation such as a system timer, an interrupt, etc. Accordingly, if it is desired to learn information on a change in a GUI involving a user operation, the entire user operation events have to be analyzed without performing any additional filtering task on the user operation events. That is, if events provided from the user accessibility management module are gathered, it is not necessary to filter system events that are irrelevant to user operations from the gathered events.

Figure 2:
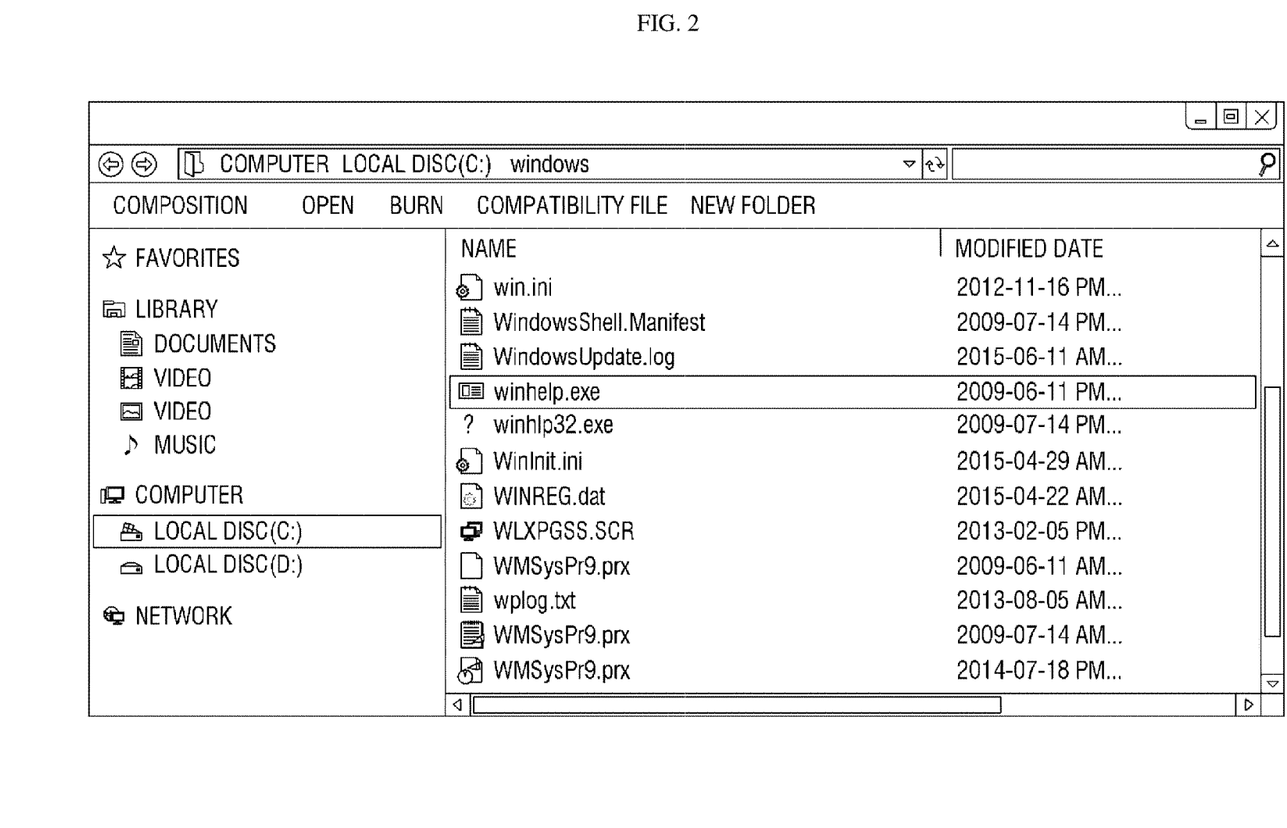
FIGS. 2 and 3 are views for illustrating how user operation events containing information on an user operation object are gathered from a user accessibility management module.
Figure 3:
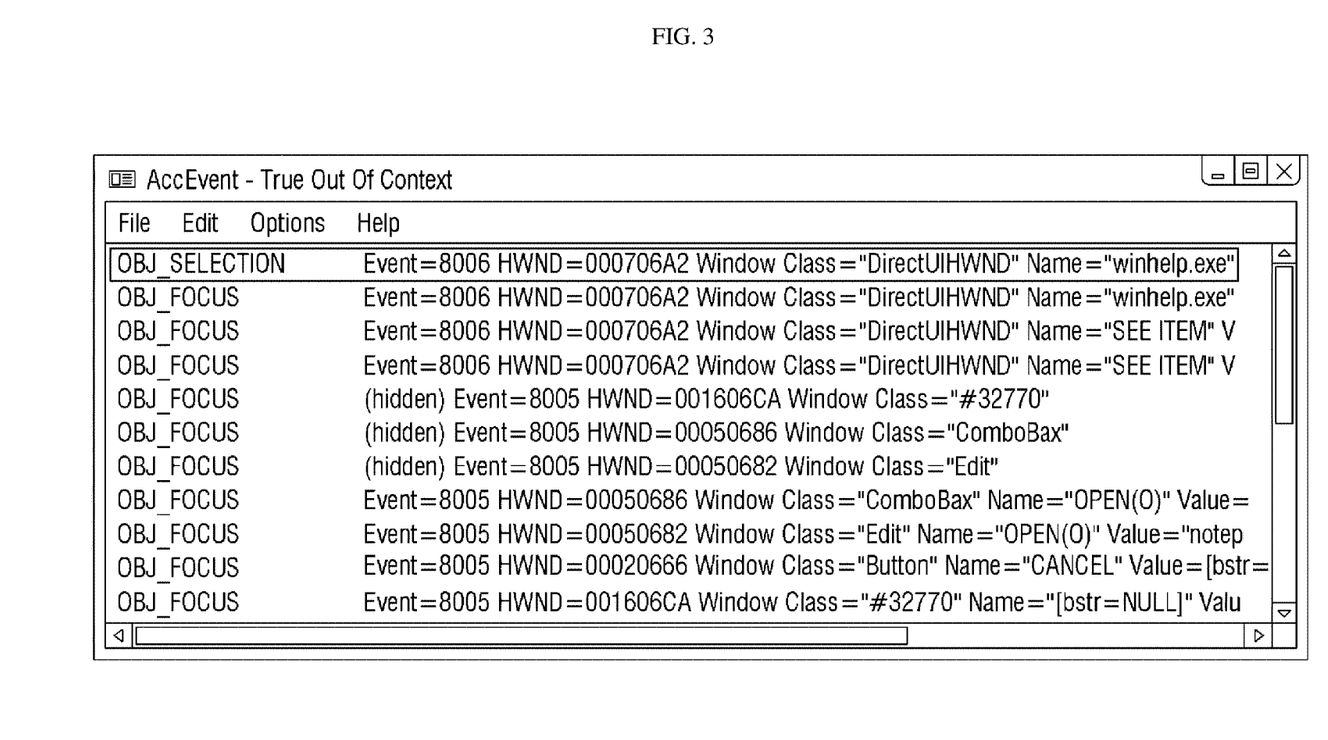

In addition, the user operation event includes name information of an object associated with a user operation. Accordingly, it is possible to check if the object associated with the user operation is accessed by using the user accessibility management module. Now, descriptions will be made with reference to FIGS. 2 and 3. In the example shown in FIG. 2, a "winhelp.exe" file is focused among files stored in a folder. In this case, as shown in FIG. 3, the user accessibility management module provides information on the name of the focused object ("winhelp.exe file") as subsidiary information (Name="winhelp.exe") of the event (OBJ_SELECTION) indicating that the object has been selected.

If the user accessibility management module is a MSAA, the event that provides the name of the accessed object (or the path to the object) by the user operation is EVENT_OBJECT_FOCUS, EVENT_OBJECT_SELECTION, EVENT_OBJECT_SELECTIONADD, EVENT_OBJECT_VALUECHANGE, EVENT_SYSTEM_DRAGDROPSTART, EVENT_SYSTEM_DRAGDROPEND.

In addition, the user operation event may also provide information on the user operation instance. The information on the instance may be, for example, the process ID or the thread ID that has provided the GUI on which the user operation is made, or the window handle (HWND) of the GUI. In FIG. 3, a point (HWND=000706A2) is depicted where the window handle of the window on which a user input is made is provided as subsidiary information of OBJ_SELECTION event. If the information on the user operation instance can be known, it can be more correctly determined whether a data access involves a user operation by way of comparing the instance with the accessing instance that has actually accessed the object.

Description will be made referring back to FIG. 1. As already described above, as the monitoring the object access is activated (operation S100), and the monitoring that the user operation event is received from the user accessibility management module is activated (operation S200), an access to the object can be detected whenever it occurs (operation S300). In addition, whenever the user inputs a user input on the GUI, a user operation event will be provided from the user accessibility management module (operation S400).

When the access occurs, the monitoring software component determines whether the accessed object is identical to the object operated by the user (operation S500).

For example, if an access to a file is made by a user operation, the access to the file is detected and a user operation event such as selecting the file will be provided. That is, the name of the accessed object will be identical to the name of the object the user is interacting with. In this case, the monitoring software component determines that the access is a normal data access and thus does not take any action for blocking the access. As shown in FIG. 2, if a "winhelp.exe" file is focused by a user operation among the file stored in a folder, it will be detected during the monitoring object access that an access is made to the "winhelp.exe" file. In addition, as shown in FIG. 3, the user accessibility management module may provide information on the name of the focused object "winhelp.exe." Accordingly, the monitoring software component determines whether the names of the two objects are identical to each other and allows for an access to the object "winhelp.exe."

On the contrary, if malicious codes attempt to leak a file to a network irrelevantly of a user operation without permission, the access to the file is detected but the user operation event for the accessed object will not be provided from the user accessibility management module. In this case, the monitoring software determines that the access is an abnormal data access and thus blocks the access to the object by the malicious codes or blocks network transmission of the object.

To block the access to the object or the network transmission of the object, the monitoring software component utilizes a hooking routine hooked for a target API or a device driver function. If it is necessary to block the access to the object or the network transmission of the object, the hooking routine returns after taking an action for preventing the routine to be hooked from being normally executed. The action may include, for example, modifying a parameter when invoking a callback routine to prevent the routine to be hooked from being normally operated.

If it is necessary to block reading a file, the hooking routine has to be executed before the file read API is executed, and thus the pre-execution callback has to be set for the file read API. If it is necessary to block network transmission, the hooking routine has to be executed before the network transmission API is executed, and thus the pre-execution callback has to be set for the network transmission API.

If the user selects a first object while the malicious codes perform an access to the second object, the accessed object will be different from the object the user is interacting with. Also in this case, the monitoring software component determines that the access is an abnormal data access and accordingly blocks the access to the object by the malicious codes or blocks network transmission of the object (operation S600).

According to this exemplary embodiment of the present disclosure, it is determined whether the accessed object is identical to the user operation object so as to determine an object access irrelevant to the user operation, so that the object access irrelevant to the user operation can be blocked.

In some embodiments, it is further determined whether an instance of an application the user is interacting with is identical to an instance of the access object, so as to determine an object access irrelevant to the user operation. This will be described with reference to FIG. 4.

Figure 4:
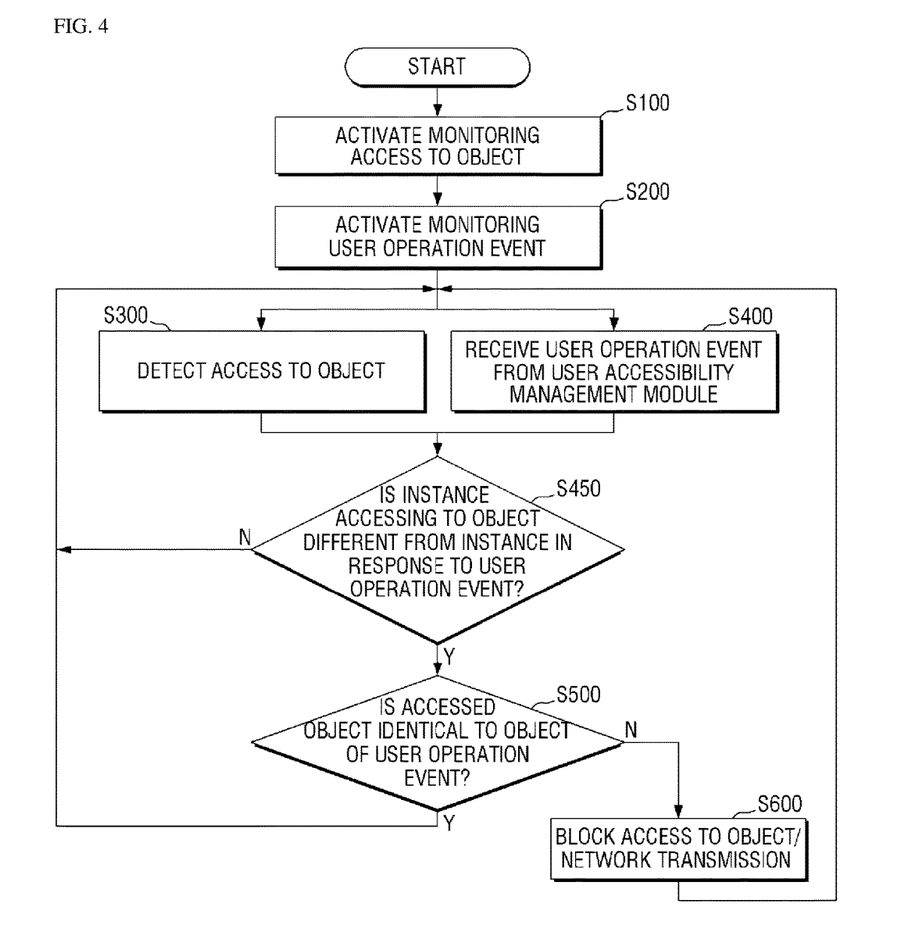
FIG. 4 is a flowchart for illustrating a method for blocking unauthorized data access according to another exemplary embodiment of the present disclosure, with an additional determining operation to those shown in FIG. 1.

As shown in FIG. 4, if the instance of the application the user is interacting with is identical to the instance having accessed the object, it is determined that the access to the object is made by the user operation and accordingly the access is permitted, even without checking whether the accessed object is identical to the object the user is interacting with (operation S450). This is because direct access to the object by the instance operated by the user is regarded as object access by the user operation.

The operation for determining whether the instances are identical to each other will be described. Initially, in order to obtain an identifier of the instance having accessed the object, a function for an identifier of a current instance in the hooking routine is executed. The hooking routine is executed in the instance having accessed the object, and thus the identifier of the instance having accessed the object can be obtained by way of executing a function for obtaining a current process ID or a function for obtaining a current thread ID, for example.

Subsequently, an identifier of the instance made by the user operation is obtained. The user operation event may provide information on the identifier of an instance operated by the user. In order to determine whether the instances are identical to each other, the identifier of the user operation instance has to be in the same format as the identifier of the instance having accessed the object. In FIG. 3, for example, a point (HWND=000706A2) is depicted where the window handle of the window on which a user input is made is provided as subsidiary information of OBJ_SELECTION event. If the identifier of the instance having accessed the object is a process ID, the process ID made by the user operation may be obtained from the user operation event by using a function for extracting a process ID from a window handle (GetWindowsThreadProcessID( )), for example.

If the user accessibility management module is a MSAA, the event that provides the window handle (HWND) of the window made by the user operation may comprise one of EVENT_OBJECT_FOCUS, EVENT_OBJECT_SELECTION, EVENT_OBJECT_SELECTIONADD, EVENT_OBJECT_VALUECHANGE, EVENT_OBJECT_LOCATIONCHANGE, EVENT_SYSTEM_CHPTURESTART, EVENT_SYSTEM_CHPTUREEND, EVENT_SYSTEM_DRAGDROPSTART, EVENT_SYSTEM_DRAGDROPEND.

Subsequently, it is determined whether the identifier of the instance having accessed the object is identical to the identifier of the instance made by the user operation. As described above, only if the identifier of the instance having accessed the object is not identical to the identifier of the instance made by the user operation (operation S450), the name of the accessed object compared with the name of the object involving the user operation (operation S500).

According to the exemplary embodiment shown in FIG. 4, the identities of the objects are not compared to each other if the instance having accessed the object is identical to the instance made by the user operation. Accordingly, the processing burdens are relieved compared to the exemplary embodiment shown in FIG. 1.

In addition, according to the exemplary embodiment shown in FIG. 4, even if the instance having accessed the object is different from the instance made by the user operation according to a user operation event, the access to the object may be permitted if the name of the accessed object is identical to the name of the object involving the user operation. According to the exemplary embodiment of the present disclosure, a valid data access by a user input is not blocked even if a process of providing a GUI for a user input is different from a process of performing an internal logic operation.

In some embodiments, a time difference between when an object is accessed and when a user operation is input may be used for determining an access to the object which is irrelevant to the user operation. This will be described with reference to FIG. 5.

Figure 5:
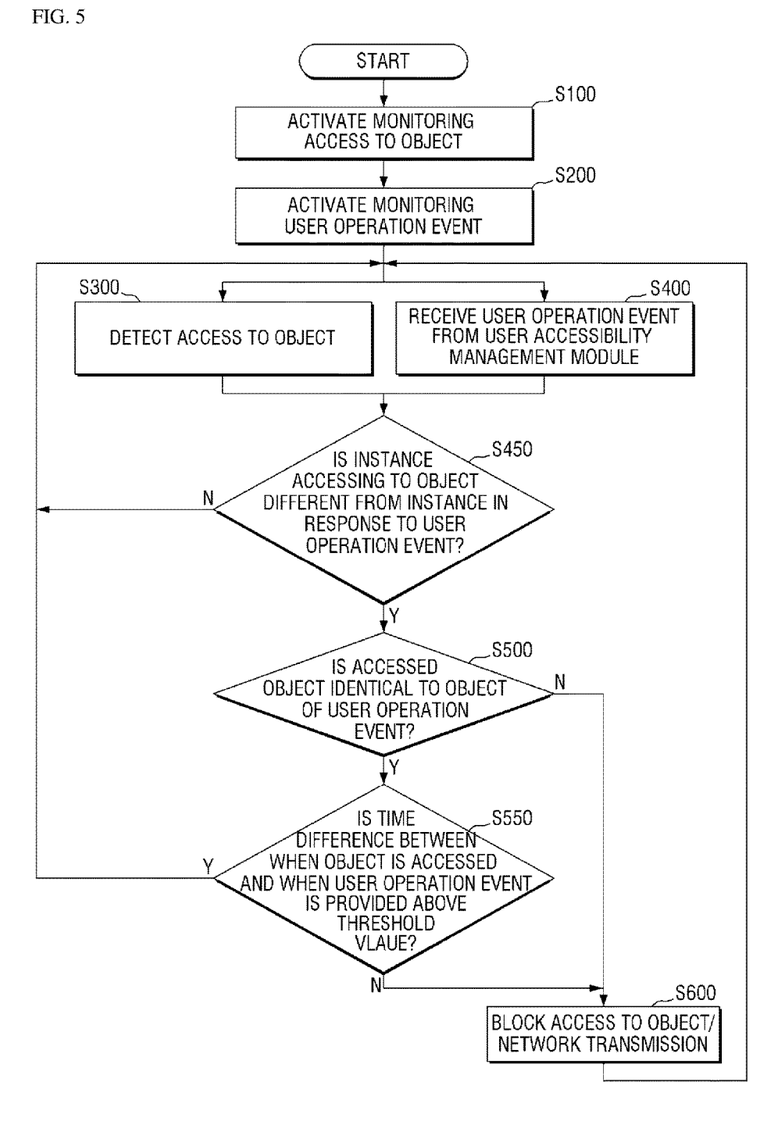
FIG. 5 is a flowchart for illustrating a method for blocking unauthorized data access according to yet another exemplary embodiment of the present disclosure, with an additional determining operation to those shown in FIG. 4.

As shown in FIG. 5, even if the instance having accessed the object is different from the user operation instance (operation S450), and the accessed object is different from the object involving the user operation (operation S500), the access to the object may be permitted if a time difference between when the object is accessed and when the user operation is input is above a threshold value (operation S550), as it is presumed that the two events are irrelevant to each other. That is, according to the exemplary embodiment of the present disclosure, it is possible to prevent a valid access to an object by a user operation from being blocked when the access to the object is simply compared with the user operation to the object without considering the time difference therebetween.

In some embodiments, a valid data access by a user input is not blocked even if a process of providing a GUI for a user input is different from a process of performing an internal logic operation. In some embodiments, to enhance security, a list of instances may be managed that may be permitted to access an object even if the instance having accessed the object is different from the user operation instance. This will be described with reference to FIG. 6.

Figure 6:
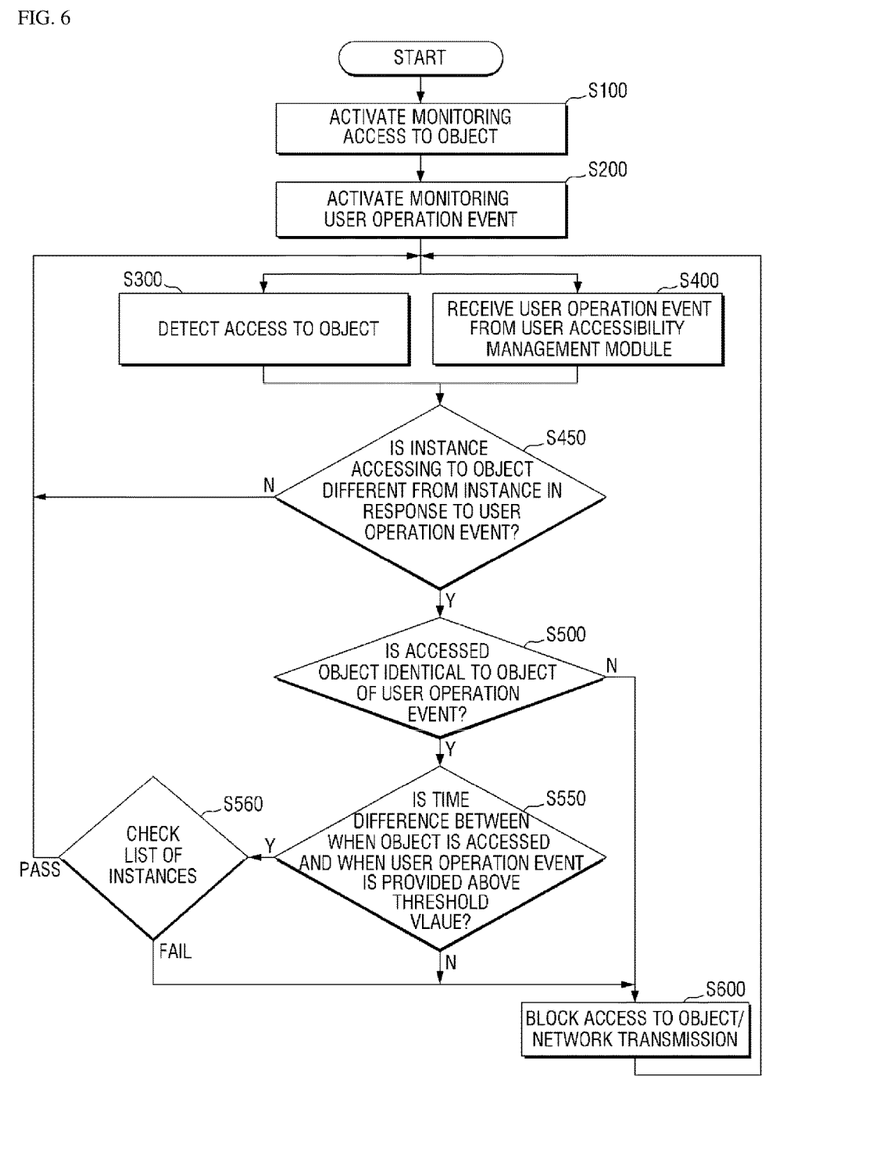
FIG. 6 is a flowchart for illustrating a method for blocking unauthorized data access according to still another exemplary embodiment of the present disclosure, with an additional determining operation to those shown in FIG. 5.

As shown in FIG. 6, if the instance having accessed the object is different from the instance made by the user operation (operation S450), and the accessed object is different from the object involving the user operation (operation S500), the access to the object may be permitted if a time difference between when the object is accessed and when the user operation is input is above a threshold value (operation S550), as it is presumed that the two instances are irrelevant to each other. In this connection, instead of immediately permitting the access to the object, the access to the object may be blocked if the instance having accessed the object and/or the instance made by the user operation is not included in the list of the instances (operation S560). The list of instances may include a variety of information items such as names of execution files, characteristic values of the execution files, hash values of the execution files, etc.

That is, the list of instances includes the information on the instances that may be permitted to access an object even if the two instance are different from each other. The list may be a list of user operation instances, a list of object access instances or a list of user operation instances/object access instances.

In FIG. 6, checking the list of instances S560 is performed after determining whether the time difference between when the object is accessed and when the user operation is input is above a threshold value S550. However, the checking the list of instances may be applied to the exemplary embodiment shown in FIG. 4. That is, if the instance having accessed the object is different from the instance made by the user operation (operation S450) while the accessed object is identical to the object involving the user operation (operation S500), the access to the object may be blocked if none of the user operation instance and the object access instance is included in the list of the instances (operation S600).

The methods according to the exemplary embodiments of the present disclosure described above with reference to FIGS. 1 to 6 may be performed by executing a computer program embodied as computer-readable codes. The computer program may be transferred from a first computing device to a second computing device via a network such as the Internet and installed in the second computing device, so that it becomes available in the second computing device. The first and second computing devices include a stationary computing device such as a server and a desktop PC, as well as a mobile computing device such as a laptop computer, a smartphone and a tablet PC.

The computer program is to perform, in conjunction with a computing device, monitoring whether there is an access to an object by an accessing instance; receiving an user operation event from a user accessibility management module, in which the user operation event is created by the user accessibility management module and includes information on an user operation object; and blocking the access to the object, if any, and/or transmission to an external device via a network, if the accessed object is different from the user operation object. The computer program may be stored in a storage medium such as a DVD-ROM and a flash memory.

Figure 7:
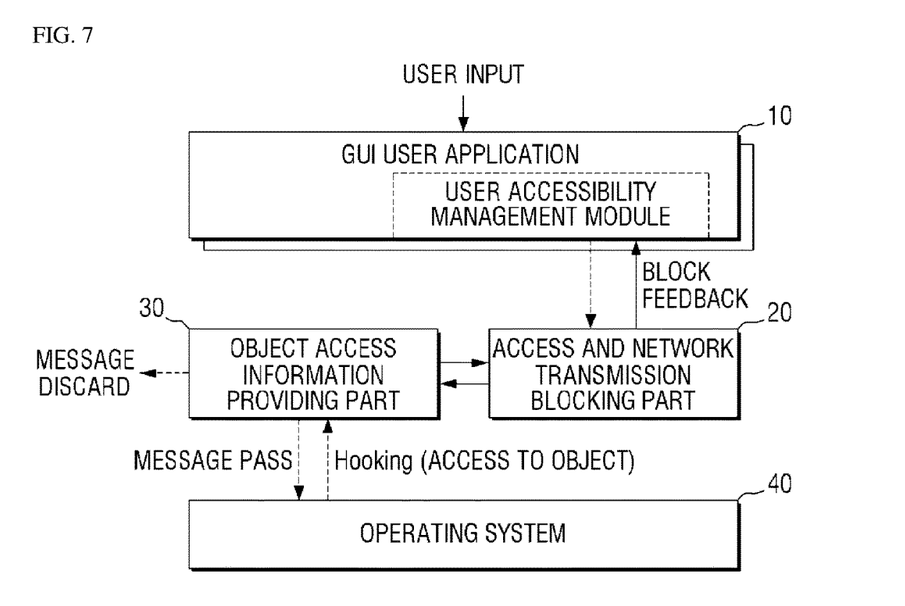
FIG. 7 is a block diagram illustrating a computing device having a feature of blocking unauthorized data access according to another exemplary embodiment of the present disclosure.

Hereinafter, the configuration and operation of a computing device according to another exemplary embodiment of the present disclosure will be described with reference to FIG. 7. FIG. 7 is a block diagram illustrating a computing device having the feature of blocking unauthorized data access according to another exemplary embodiment of the present disclosure.

In the computing device according to this exemplary embodiment, a user application 10, a monitoring software component and an operating system 40 are installed. The monitoring software component includes an object access information providing part 30, and an access and network transmission blocking part 20.

The object access information providing part 30 detects an access to an object by an accessing instance via API hooking. The object access information providing part 30 may be a hooking routine (a callback function) that is injected into the accessing instance by API hooking, etc. If the accessed object is different from the object selected by a user, the access is blocked.

When a user input is made on the user application 10 using a GUI, the user accessibility management module provides a user operation event containing information on the user input to the access and network transmission blocking part 20.

The access and network transmission blocking part 20 transmits/receives data to/from the object access information providing part 30 to determine whether to permit an access to an object. In some embodiments, the object access information providing part 30 may transmit/receive data to/from the access and network transmission blocking part 20 to determine whether to permit an access to an object.

As described above, the access to the object is permitted if the instance having accessed the object is identical to the user operation instance.

Even if the instance having accessed the object is different from the user operation instance, the access to the object may be permitted if the name of the accessed object is identical to the name of the user operation object. To enhance security, a list of instances may be managed which includes instances that may be permitted to access an object even if the instance having accessed the object is different from the user operation instance.

Furthermore, even if the instance having accessed the object is different from the user operation instance and the name of the accessed object is different from the name of the user operation object, the access to the object may be permitted if a time difference between the access and the user operation is above a threshold value.

The access to the object is blocked in any other cases than those above mentioned. After a decision is made to block the access, the object access information providing part 30, i.e., the hooking routine (callback function) takes an action to prohibit the hooking target API from being executed such as discarding a message or modifying the callback function. On the other hand, if a decision is made to permit the access to the object, the object access information providing part 30, i.e., the hooking routine (callback function) hands over control to the hooking target API so that the hooking target API is normally executed.

Figure 8:
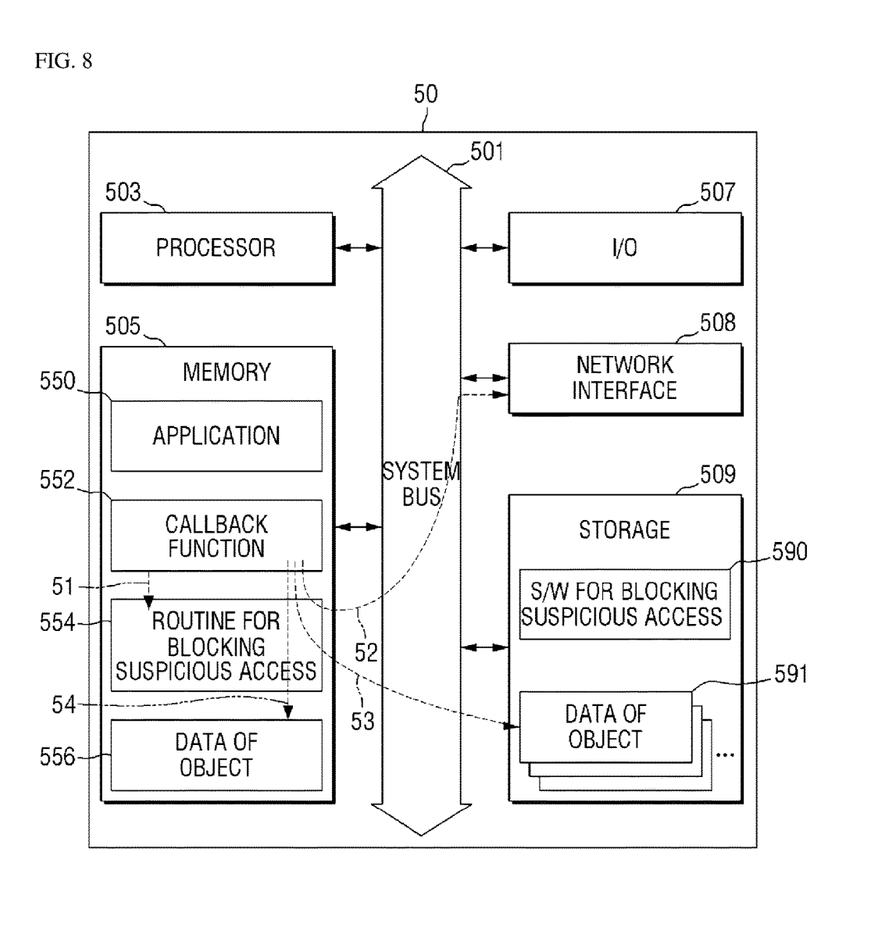
FIG. 8 is a block diagram illustrating a hardware configuration of a computing device having the unauthorized data access blocking functionality according to another exemplary embodiment of the present disclosure.

FIG. 8 is a block diagram illustrating a hardware configuration of a computing device having unauthorized data access blocking feature according to another exemplary embodiment of the present disclosure.

As shown in FIG. 8, a computing device 50 having the feature of blocking unauthorized data access according to this exemplary embodiment of the present disclosure may include at least one processor 503, a network interface 508, storage 509, input/output (I/O) devices 507 and a memory (RAM) 505. The processing 503, the network interface 508, the storage 509, the memory 505 and the I/O devices 507 transmit/receive data via a system bus 501. The I/O devices 507 refer to an input device such as a keyboard, a mouse and a touch screen, and an output device such as a display.

The storage 509 stores data of an object 591 such as a file therein. The access to an object stored in the storage 509 may be blocked if the object to be accessed is different from the user operation object or if no user operation event is provided for the object to be accessed, and may be permitted otherwise.

Operations to be executed are loaded into the memory 505. Specifically, at least one user application 550, a callback function 552 loaded as a computer program 590 for blocking suspicious access stored in the storage 509 is installed, and a routine 554 for blocking suspicious access are loaded into the memory 505. In addition to the operations to be executed, there may exist an object to be loaded into the memory 505 for faster data input/output. If such an object exists, the data of the object may also be stored in the memory 505.

The processor 503 installs the computer program 590 for blocking suspicious access, which is to be stored in the storage. The computer program includes an operation to monitor whether there is an access to an object by an accessing instance; an operation to receive an user operation event from a user accessibility management module, in which the user operation event is created by the user accessibility management module and includes information on a user operation object; and an operation to block the access to the object, if any, and/or transmission to an external device via a network, if the accessed object is different from the object involving the user operation.

The processor executes the callback function 552 for detecting an access to an object, which is loaded into the memory 505 as the program is installed, and the routine 554 for blocking suspicious access.

Hereinafter, the operation of the computing device 50 having the feature of blocking unauthorized data access according to an exemplary embodiment of the present disclosure will be described.

When a user operation is made on the user application 550, the routine 554 for blocking suspicious access receives a user operation event containing information on the object involving the user operation from the user accessibility management module. The user accessibility management module may be a routine contained in the user application 550 or may be a routine included in the operating system (not shown) of the computing device 50.

The callback function 552 is a function installed as API hooking is set for a function for accessing to data in the storage 509 or the memory 505 or a function for network transmission via the network interface 508. The callback function 552 is invoked together with the hooking target API when the hooking target API is invoked. The callback function 552 detects an access to an object. The routine 554 for blocking suspicious access determines whether the access is made by a user operation.

As described above, the access to the object may be permitted if the instance having accessed the object is identical to the user operation instance. In addition, even if the instance having accessed the object is different from the user operation instance, the access to the object may be permitted if the name of the accessed object is identical to the name of the user operation object. To enhance security, a list of instances may be managed which includes instances that may be permitted to access an object even if the instance having accessed the object is different from the user operation instance. Even if the instance having accessed the object is different from the user operation instance and the name of the accessed object is different from the name of the user operation object, the access to the object may be permitted if a time difference between the access and the user operation is above a threshold value.

Otherwise, the access to the object in the memory (54), the access to the object in the storage (53) and transmission of the object via a network (52) may be permitted.

The access to the object is blocked in any other cases than those above mentioned (51).

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A method for blocking unauthorized data access, the method comprising:
   monitoring whether there is an access to an object by an accessing instance;
   receiving a user operation event of a user input on a user operation object and a name of the user operation object as subsidiary information of the user operation event, from a user accessibility management module, in response to the user input;
   obtaining a first identifier of an accessing instance having accessed the object as a result of the monitoring, wherein the first identifier is an ID of a process or a thread executed by the access;
   obtaining a second identifier of a user operation instance made by the user operation event of the user input while accessing to the object is detected, wherein the second identifier is an ID of a process or a thread related to the user operation object;
   blocking at least one of the access to the object and a transmission of the object to an external device via a network, when the first identifier is not identical to the second identifier and the name of the user operation object is not identical to a name of the accessed object; and
   permitting at least one of the access to the object and the transmission of the object to the external device via the network based on a decision that the accessing instance is associated with the user operation instance when the name of the accessed object is identical to the name of the user operation object even though the first identifier is different from the second identifier or when the first identifier is identical to the second identifier.

2. The method of claim 1, wherein the user operation event further comprises information on a window having the user operation object, and wherein the obtaining the second ID comprises:
   obtaining a second identifier from the information on the window.

3. The method of claim 2, wherein the permitting at least one of the access to the object and the transmission of the object to the external device via the network based on a decision that the accessing instance is associated with the user operation instance when the name of the accessed object is identical to the name of the user operation object even though the first identifier is different from the second identifier comprises:
   permitting at least one of the access to the object and the transmission of the object to the external device via the network only when at least one of the user operation instance and the accessing instance is included in a list of instances stored in advance even though the name of the accessed object is identical to the name of the user operation object.

4. The method of claim 1, wherein the blocking at least one of the access to the object and the transmission of the object to the external device via the network comprises:
   permitting at least one of the access to the object and the transmission of the object to the external device via the network when a time difference between when the object is accessed and when the user operation event is provided is above a predetermined threshold value even though the accessed object is not identical to the user operation object.

5. The method of claim 1, wherein the user accessibility management module creates only events related to user operations.

6. The method of claim 1, wherein the user accessibility management module is configured to modify a user interface provided by an application so that it provides accessibility for users who have disabilities.

7. The method of claim 1, wherein the user accessibility management module is a Microsoft active accessibility (MSAA) module.

8. The method of claim 7, wherein the user operation event comprises one of EVENT_OBJECT_FOCUS, EVENT_OBJECT_SELECTION, EVENT_OBJECT_SELECTIONADD, EVENT_OBJECT_VALUECHANGE, EVENT_SYSTEM_DRAGDROPSTART, and EVENT_SYSTEM_DRAGDROPEND.

9. A computer program product stored in a non-transitory computer storage medium, when executed by a processor device, causes a computing device to perform a method comprising:

monitoring whether there is an access to an object by an accessing instance;

receiving a user operation event of a user input on a user operation object and a name of the user operation object as subsidiary information of the user operation event, from a user accessibility management module, in response to the user input;

obtaining a first identifier of an accessing instance having accessed the object as a result of the monitoring, wherein the first identifier is an ID of a process or a thread executed by the access;

obtaining a second identifier of a user operation instance made by the user operation event of the user input while accessing to the object is detected, wherein the second identifier is an ID of a process or a thread related to the user operation object;

blocking at least one of the access to the object and a transmission of the object to an external device via a network, when the first identifier is not identical to the second identifier and the name of the user operation object is not identical to a name of the accessed object; and permitting at least one of the access to the object and the transmission of the object to the external device via the network based on a decision that the accessing instance is associated with the user operation instance when the name of the accessed object is identical to the name of the user operation object even though the first identifier is different from the second identifier or when the first identifier is identical to the second identifier.

10. A computing device having a feature of blocking unauthorized data access, the computing device comprising:

a network interface;

at least one hardware processor;

a memory configured to load a computer program executed by the at least one hardware processor; and storage configured to store data on at least one object, wherein the computer program comprises:

an operation to monitor whether there is an access to an object in the storage by an accessing instance;

an operation to receive a user operation event of a user input on a user operation object and a name of the user operation object as subsidiary information of the user operation event, from a user accessibility management module, in response to the user input an operation to obtain a first identifier of an accessing instance having accessed the object as a result of the monitoring, wherein the first identifier is an ID of a process or a thread executed by the access;

an operation to obtain a second identifier of a user operation instance made by the user operation event of the user input while accessing to the object is detected, wherein the second identifier is an ID of a process or a thread related to the user operation object; and an operation to block at least one of the access to the object and a transmission of the object to an external device via a network, when the first identifier is not identical to the second identifier and the name of the user operation object is not identical to a name of the accessed object, wherein the operation to block permits at least one of the access to the object and the transmission of the object to the external device via the network based on a decision that the accessing instance is associated with the user operation instance when the name of the accessed object is identical to the name of the user operation object even though the first identifier is different from the second identifier or when the first identifier is identical to the second identifier.

\* \* \* \* \*